United States Patent
Murphy et al.

(10) Patent No.: US 11,467,624 B2
(45) Date of Patent: Oct. 11, 2022

(54) CLOCK DOMAIN TRANSLATION FOR NON-SYNCHRONIZED SENSORS

(71) Applicant: Building Robotics, Inc., Oakland, CA (US)

(72) Inventors: Thomas Murphy, Boulder Creek, CA (US); William Kerry Keal, San Jose, CA (US)

(73) Assignee: Building Robotics, Inc., Oakland, CA (US)

( * ) Notice: Subject to any disclaimer, the term of this patent is extended or adjusted under 35 U.S.C. 154(b) by 280 days.

(21) Appl. No.: 16/851,698

(22) Filed: Apr. 17, 2020

(65) Prior Publication Data
US 2021/0325925 A1    Oct. 21, 2021

(51) Int. Cl.
*G06F 1/12* (2006.01)
*G06F 1/10* (2006.01)
*H04W 84/18* (2009.01)

(52) U.S. Cl.
CPC ............ *G06F 1/12* (2013.01); *G06F 1/10* (2013.01); *H04W 84/18* (2013.01)

(58) Field of Classification Search
CPC .................................... G06F 1/12; G06F 1/10
See application file for complete search history.

(56) References Cited

U.S. PATENT DOCUMENTS

| | | | | |
|---|---|---|---|---|
| 9,363,784 B1* | 6/2016 | Friday | .............. | H04W 64/003 |
| 2010/0091657 A1* | 4/2010 | Tsfaty | .............. | H04W 52/0296 370/241 |
| 2013/0044658 A1* | 2/2013 | Zhu | .............. | H04W 52/0229 370/311 |
| 2015/0208436 A1* | 7/2015 | Seok | .............. | H04W 74/08 370/329 |

(Continued)

FOREIGN PATENT DOCUMENTS

| | | |
|---|---|---|
| EP | 3869283 | 8/2021 |
| WO | 2019059478 | 3/2019 |

OTHER PUBLICATIONS

PCT Search Report dated Jul. 15, 2021, for PCT Application No. PCT/US2021/021615, 14 pages.

(Continued)

*Primary Examiner* — Phil K Nguyen

(57) ABSTRACT

There is described an upstream device for translating clock domain for non-synchronized sensors comprising a communication component, a memory component, and a processor. The communication component detects a report received from a sensor that includes a beacon receive time in a sensor clock domain and a current report transmit time in the sensor clock domain. The memory component provides a previous report receive time in the aggregator clock domain and a previous report transmit time in the sensor clock domain. The processor identifies a current report receive time in an aggregator clock domain based on the report detected by the communication component. The processor also determines a (Continued)

beacon receive time in the aggregator clock domain based, at least in part, on the beacon receive time in the sensor clock domain, the current report transmit time, the current report receive time, the previous report receive time, the previous report transmit time.

14 Claims, 7 Drawing Sheets

(56) References Cited

U.S. PATENT DOCUMENTS

| | | | | |
|---|---|---|---|---|
| 2015/0257104 | A1* | 9/2015 | Choi | H04W 52/0229 |
| | | | | 455/41.3 |
| 2015/0334676 | A1* | 11/2015 | Hart | H04W 64/003 |
| | | | | 455/456.1 |
| 2016/0007309 | A1* | 1/2016 | Lee | H04W 56/002 |
| | | | | 370/350 |
| 2017/0214117 | A1* | 7/2017 | Gracyk | G01S 13/767 |
| 2018/0206174 | A1* | 7/2018 | Zhou | H04W 76/14 |
| 2019/0059107 | A1* | 2/2019 | Inoki | H04W 28/0284 |
| 2019/0150214 | A1* | 5/2019 | Zhou | H04L 1/1621 |
| | | | | 370/329 |
| 2020/0053774 | A1* | 2/2020 | Inoki | H04W 74/085 |

OTHER PUBLICATIONS

Hyo-Sung Ahn et al: "One-way ranging technique for CSS-based indoor localization"; Industrial Informatics, 2008; INDIN 2008; 6th IEEE International Conference On, IEEE; Piscataway, NJ, USA; 6 pages.

* cited by examiner

CLOCK DOMAIN TRANSLATION FOR NON-SYNCHRONIZED SENSORS

RELATED APPLICATIONS

This application is related to U.S. patent application Ser. No. 16/851,773, titled Clock Domain Translation for Non-synchronized Sensors, by Thomas Murphy and William Kerry Keal, filed on Apr. 17, 2020, and incorporated by reference in its entirety.

FIELD OF THE INVENTION

The present invention generally relates to sensors of building management systems and, more particularly, systems and methods for time correction of non-synchronized sensors for building management systems.

BACKGROUND

Building management systems provide the capability of managing many building management components from a central front-end interface or group of interfaces. These building management components include building equipment for lighting, power, heating, ventilation, air conditioning, fire safety, and security. The building management systems offer operational and sustainability benefits for building developers, managers, and occupants.

Advanced building management systems may determine the quantity and location of people located in a building or a particular area of the building. For example, a lighting system of the building management system may include motion sensors positioned near ceiling light fixtures to detect proximal motion. The sensors of the lighting system may deliver timing data corresponding to the detected motion to a central server. The central server will need precise timing data in order to track people accurately. Unfortunately, some motion sensors of lighting systems do not provide precise timing data. Each motion sensor may include an on-board clock but the clock of one motion sensor may be misaligned in time relative to another motion sensor of the lighting system.

Other types of building management systems may utilize time difference of arrival (TDOA) by positioning multiple receivers, also known as anchors, at known locations of a facility. TDOA gathers arrival times at the receivers of a beacon emitted within proximity, and a location of the device emitting the beacon is determined from deltas between the arrival times. In order to generate accurate deltas, it is important for the arrival times to be in the same clock domain.

In order to employ the required clock matching, traditional TDOA systems use wired sync components that drive-up the cost of installation and, in certain situations, may not be practical. The TDOA systems may also utilized wireless sync components, which involves periodic transmission of timing packets to the receivers and calculations of correction factors at the receivers. On the other hand, the receivers for wireless sync may utilize high accuracy oscillator (such as an OCXO) or other components that are expensive and may need additional clock correction. Thus, existing systems do not adequately address the problem of insufficient precision of timing data received from non-synchronized devices.

SUMMARY

A building management system requires accurate timing data in order to provide building automation features, such as determining people and asset location within a managed facility. Unfortunately, the time clocks of one or more of signal sensors may not be synchronized, thus making the determination of location difficult. The building management system may perform clock domain translation of raw data received from non-synchronized sensors and take into consideration the appropriate time adjustments. In this manner, the building management system may adjust to the sensor timing data to compensate for lack of synchronized clocks so that all sensor data are based on the same time base before determining people and/or asset location at the managed facility.

One aspect is an upstream device for translating clock domain for non-synchronized sensors comprising a communication component, a memory component, and a processor. The communication component is configured to detect a report received from a particular sensor of the non-synchronized sensors. The report includes a beacon receive time in a sensor clock domain and a current report transmit time in the sensor clock domain. The memory component is configured to provide a previous report receive time in the aggregator clock domain and a previous report transmit time in the sensor clock domain. The processor is configured to identify a current report receive time in an aggregator clock domain based on the report detected by the communication component and determine a beacon receive time in the aggregator clock domain based, at least in part, on the beacon receive time in the sensor clock domain, the current report transmit time, the current report receive time, the previous report receive time, the previous report transmit time.

Another aspect is a method for translating clock domain for non-synchronized sensors. A report, received from a particular sensor of the non-synchronized sensors, is detected at a communication component. The report includes a beacon receive time in a sensor clock domain and a current report transmit time in the sensor clock domain. A current report receive time in an aggregator clock domain is identified in response to detecting the report at the communication component. A previous report receive time in the aggregator clock domain and a previous report transmit time in the sensor clock domain are retrieved from the memory component. A beacon receive time in the aggregator clock domain is determined at a processor based, at least in part, on the beacon receive time in the sensor clock domain, the current report transmit time, the current report receive time, the previous report receive time, the previous report transmit time.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
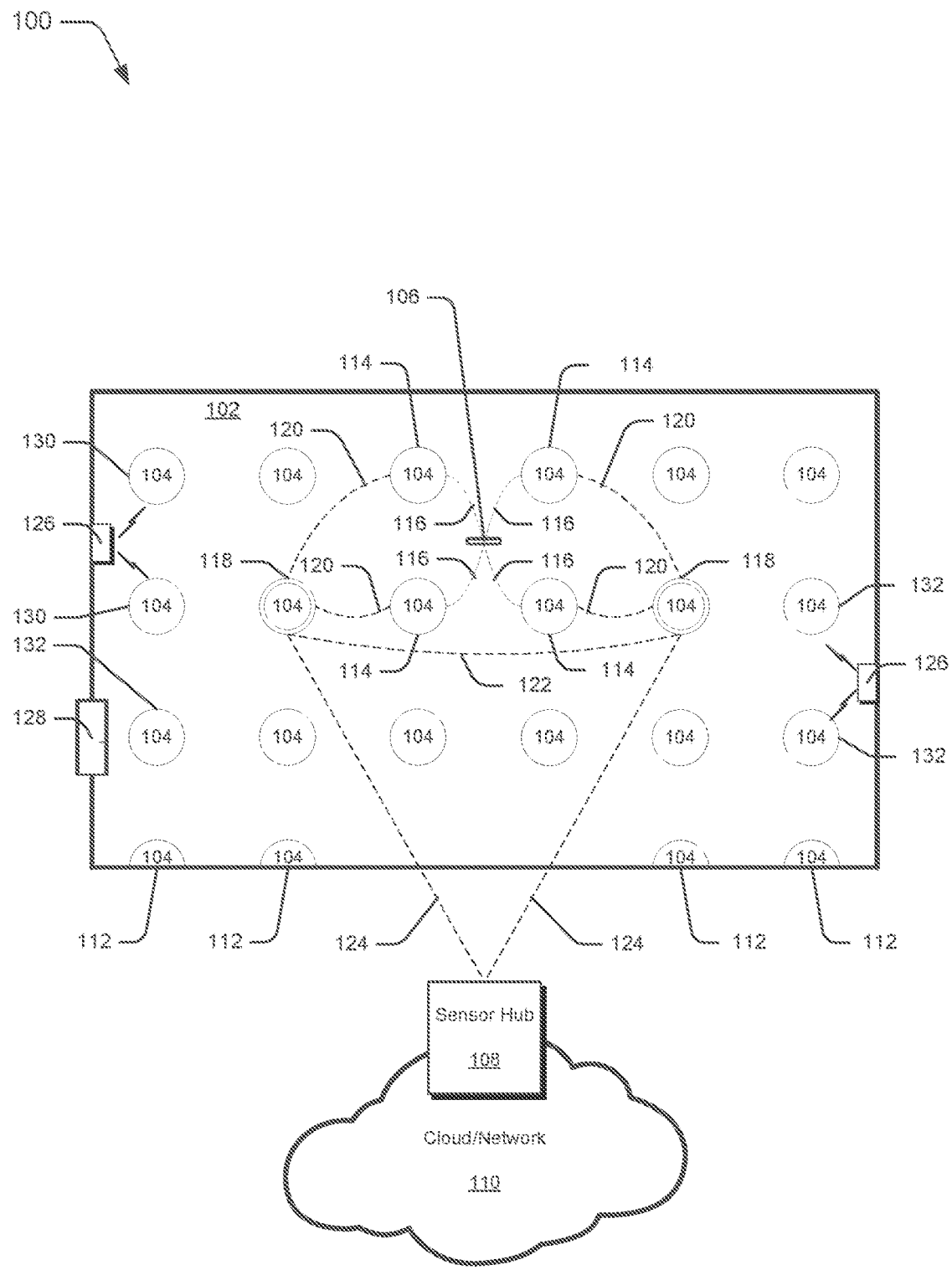
FIG. 1 is an illustration of an environment in an example implementation that is operable to employ techniques described herein.

Various technologies that pertain to systems and methods that facilitate clock domain translation for non-synchronized sensors will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

In a traditional implementation of time difference of arrival (TDOA), sensors are required to be clock-synced to within a few parts-per-billion. The greatest impact of rate skew between the clocks of various sensors may be observed in the deterioration of measurement quality with increasing dwell time at each sensor. Dwell time is the time between receiving a beacon and sending the measurement data upstream to a collection point, such as an upstream device. For example, if a measurement is held for one second before being forwarded to the upstream device, a 1 parts-per-million clock skew may result in a measurement error of about 300 meters (using $3\times10^8$ m/s as an approximation of the speed of light). Even a 1 parts-per-billion skew would result in an error of about 0.3 meters, just short of achieving accuracy of less than a foot.

Clock domain translation is used to avoid this requirement. The necessary information is transmitted from the sensors to the upstream devices, and the upstream device converts the measurement data from each sensor's clock domain to the clock domain of the upstream devices. For example, linear interpolation may be implemented for the conversion, particularly where the clock rate error remains relatively constant. More sophisticated conversion techniques may be implemented for systems subject to significant clock rate drift within the dwell time.

Referring to FIG. 1, there is shown a system 100 for clock domain translation to provide one or more building automation features, such as determining people and asset location within a managed facility. Although a facility may include various partitioned or designated areas such as floors, rooms, hallways, or defined open areas, the example shown in FIG. 1 illustrates a single room 102 to simply the explanation for employing the techniques described herein.

Devices of the system 100 for clock domain translation, implemented for a given area of the facility, may include a source device and various devices upstream from the source device (upstream devices). The upstream devices, such as sensors 104, may be distributed throughout the area or room 102, evenly or otherwise, as may be preferred for people or asset detection. The upstream devices, particularly the sensors 104, are configured to detect beacons broadcast by one or more sources, such as a tag 106, associated with a position of an occupants or an asset. The occupant or asset may support the tag 106 for detection by the sensors 104 to facilitate location detection of the sources or other building automation feature. Each of the tags 106 may be any type of transportable device capable of wireless communication with the sensors 104 of the facility. Examples of tags 106 include, but are not limited to, mobile devices, wearables, wireless communication devices, tablets, portable computing devices, and any other type of transportable device including circuitry for transmitting a beacon. Each tag 106 may be a standalone device or integrated functionally in another device, such as a badge, name tag, phone, or apparel.

Wireless communication technologies that may be used to transmit the beacon include, but are not limited to, Ultrawide Band, Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology, may be utilized for implementing the techniques described herein. Embodiments of the tag 106 may include a communication circuit utilizing one or more of these technologies. For example, for one embodiment, each tag may include a communication circuit based ultrawide band technology. For another embodiment, each tag may include a first communication circuit based on ultrawide band technology and a second communication circuit based on Bluetooth (BLE) technology.

In addition to the sensors 104, other upstream devices may include a sensor hub 108, such as an access point, a gateway, or one or more cloud devices. The sensor hub 108 may communicate directly or indirectly with the sensors 104, and the interconnection between the sensor hub and the sensors may include wired and/or wireless connections. The sensor hub 108 may be co-located with some or all sensors 104 at a facility or the sensor hub may be located remote from the sensors and/or remote from the facility. For some embodiments, part or all of the upstream device 104, 108 may be located in a cloud or other type of communication network 110, such as the Internet. For other embodiments, part or all of the upstream devices 104, 108 may be located at the same facility as the sensors 104. Within each area of the facility, each sensor may be located at a ceiling, floor, wall, window, door, or somewhere therebetween (such as being mounted to a column/post or positioned on a table or partition. For example, several of the sensors 104 shown in FIG. 1 may be located in the ceiling near a light fixture. As another example, some or all of the sensors 104, 112 may be mounted to a wall, particularly if a power source is nearby.

The tag 106 may broadcast a beacon to upstream devices, such as the sensors 104, in proximity to the tag. For the example shown in FIG. 1, proximal sensors 114 located closest to the tag 106 may receive the broadcast beacon 116 transmitted by the tag. Also, for this example, the broadcast beacon may be received by other sensors (104 but not specifically identified), in addition to the closest proximal sensors 114 in proximity to the tag 106. The broadcast range of the tag 106 for transmitting the broadcast beacon 116 may be limited by the capabilities of the tag, such as power and energy storage, as well as the proximity of the tag to the sensors 104 in view of distance and any obstructions therebetween. Also, multiple tags may transmit broadcast beacons 116 to the sensors 104.

Each tag 106 may transmit a broadcast beacon 116 in response to signals received from one or more components of the device. For example, the tag 106 may transmit the broadcast beacon in response to a periodic signal from a timing circuit, an activity signal from a motion sensor, an environment signal from an environmental sensor, an external signal from a communication component, or a combination of factors based on information received from more than one component. The signals received from the other component(s) may be utilized in order to conserve energy, enhance performance, or serve other purposes for the tag 106.

The system 100 for clock domain translation includes aggregators 118, which are a type of upstream device that receives reports 120 from the sensors 104. The reports 120 received by the aggregators 118 include information associated with one or more beacons received by the sensors 104. For some embodiments, the aggregators 118 may be based on the same or similar hardware as the other sensors 104 since they communicate via a common wireless communication technology, as represented by FIG. 1 by the designation of reference number 104 for both the aggregators 118 and the other sensors 104. For some embodiments, an aggregator 118 may operate as a sensor 104 for detecting/receiving beacons from the tag 106 as well as serving as an upstream collection point for receiving measurement data from the sensors.

The sensor 104, particularly the aggregators 118, communicate with many different devices of the system 100. As described above, the aggregators 118 receive reports from the sensors 104 and may (for some embodiments) receive beacons from the tags 106. Aggregators 118 may also communicate with each other via aggregator-to-aggregator link 122 to, for example, share information with each other and/or forward information 124 to upstream devices through one another, such as the sensor hub 108. For example, information 124 shared with the sensor hub 108 may include information associated with the beacon 116 provided by the tag 106, information associated with the report 120 provided by the sensors 104, as well as any other information identified or determined by the aggregators 118.

The system 100 for clock domain translations may operate in cooperation or coordination with other systems of the building management system of the facility. For example, other systems of the building management system may include user-activated controls 126 for managing one or more sensors 104 and/or user-accessible portals 128 for allowing passage in and out of the room 102. For example, the sensors 104 may be used to manage lighting conditions in the room 102 in response to signals received from the user-activated controls 126. The user-activated controls 126 may require rapid reaction time and, thus, communicate with control-proximal sensors 130 in proximity to the controls 126 using a different wireless communication technology. For that reason, the sensors 104 (including the aggregators 118) may communicate with each other using one technology (such as ultrawide band) and communicate with the user-activated controls 126 using a different technology (such as Bluetooth or BLE). For lighting control in particular, lights may need to be activated either through a motion signal or a light signal and the activation may need to happen immediately. By using a different technology for communication, gaps in communication network (such as ultrawide band) to send the activation are not needed. The sensors 104 and/or aggregators 118 may forward an activation message with a lighting group number associated with the message. If the sensor 104 and/or aggregator 118 is not part of the lighting group, the device will not forward the message, unless a special override forward flag is set for that sensor or aggregator.

As another example, the system 100 for clock domain translation or other systems may have a need to know about activity near the user-accessible portals 128. Portal-proximal sensors 132 in proximity to the user-accessible portals 128 may provide a special or different signal to the system 100 so that the system may process and/or react differently to the data associated portal activity as may be needed.

Figure 2:
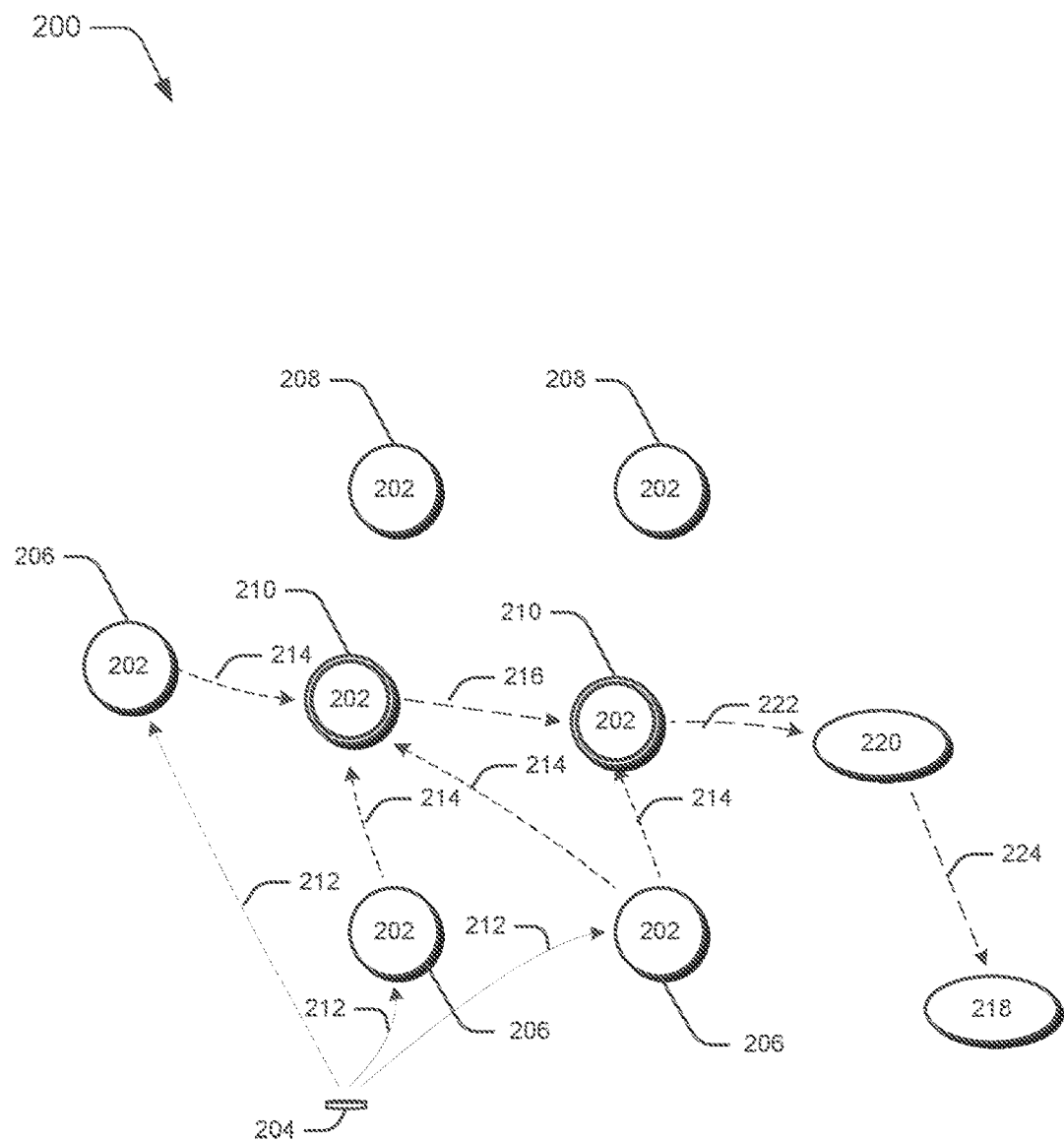
FIG. 2 depicts an abstract view of an example, partial group of devices of FIG. 1 operable to employ techniques described herein.

Referring to FIG. 2, there is shown an abstract view of an example, partial group of devices represented by FIG. 1. Specifically, FIG. 2 illustrates various upstream devices, such as sensors 202, communicating with a tag 204. The upstream devices may include proximal sensors 206 in proximity to the tag 204 as well as non-proximal sensors 208 beyond proximity to the tag. For some embodiments, the proximal sensors 206 may be in receiving range of a beacon transmitted by the tag 204 whereas non-proximal sensors 208 may be located beyond the receiving range of the beacon. For other embodiments, one or more the non-proximal sensors 208 may be capable of receiving the beacon but, for other reasons, are not configured to recognize or utilize the beacon. The upstream device may also include aggregators 210 co-located with the proximal and non-proximal sensors 206, 208. The aggregators 210 receive reports from the proximal and non-proximal sensors 206, 208 and forward the reports or information based on the reports to other upstream devices. For some embodiments, the aggregators 210 may include capabilities of the proximal and non-proximal sensors 206, 208, such as receiving beacons from the tag 204.

The sensors 202 may receive from the tag 204 a beacon 212 that includes a tag identification associated with the tag. When each sensor 202 receives the beacon 212 from the tag 204, the sensor identifies a beacon receive time in the sensor clock domain associated with the beacon and records the tag identification and the beacon receive time in the sensor clock domain. Periodically, each sensor 202 may transmit a report 214, in the form of a communication packet, to one or more aggregators 210 that includes a list of the tag identifications and the beacon receive times in the sensor clock domain. Before or while transmitting the report 214, each sensor 202 determines a current sensor transmit time in the sensor clock domain, corresponding to a time at which the report will be sent, and includes the current sensor transmit time in the report. For some embodiments, a propagation delay from the sensor 202 to the aggregator 210, or information required to calculate the propagation delay, may also be included. The system 100 would track multiple propagation delays in which a propagation delay value may be associated with each sensor/aggregator pair. Information based on the reports 216, including the reports 214 themselves, may also be communicated between sensors 202, particularly between aggregators 210.

For some embodiments, the sensors 202 and the aggregators 210 may include the same or similar hardware, each including a ultrawide band communication circuit. Thus, some sensor 202 may be devoted as aggregators 210 because ultrawide band location may require less sensor measurements than Bluetooth location. The aggregators 210 may also operate as hoppers and provide a base for the ultrawide band network of sensors 202.

For some embodiments, the tag 204 and the proximal and non-proximal sensors 206, 208 communicate via a first channel of a particular radio technology, and the proximal and non-proximal sensors 206, 208 and the upstream device (such as 210, 218, or 220) communicate via a second channel of the particular radio technology. For example, the ultrawide band network of sensors may operate using two or more channels. One channel, referred to as channel A, may be substantially devoted to listening to tags, and another channel, referred to as channel B, may be devoted to network traffic. Thus, the sensors 202 may listen for the beacon 212 on channel A, and the aggregators 210 may listen for the reports 214 on channel B. The aggregators 210 may also solve for the relative time differences between tag beacon data of the sensors 202.

The upstream device or devices may include the aggregators 210, the sensor hub, or a combination of the aggregators and the sensor hub. Any upstream device or combination of upstream devices may perform employ techniques described herein to determine a beacon received time based on the reports 214 collected from the sensors 202. Examples of the sensor hub include, but are not limited to, a gateway 220 and an access point 222. The gateway 220 may receive data 222, 224 from the network of sensors and facilitate communications with another discrete network, such as one operating in the cloud. The access point 222 may receive first data 222 from the network of sensors and convert the first data to a second data 224 to facilitate communications between the network of sensors and the gateway 220.

Figure 3:
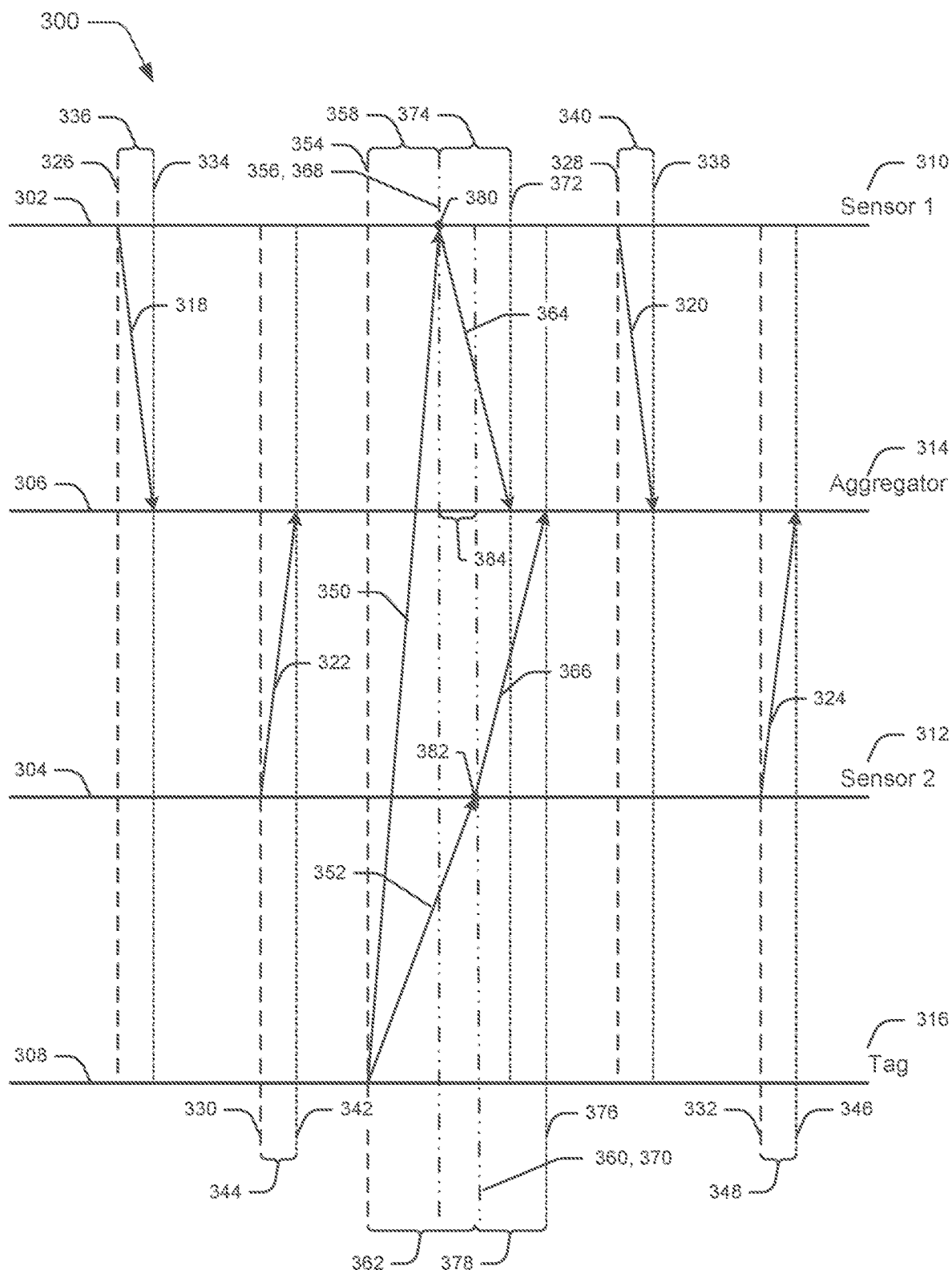
FIG. 3 is a timing diagram of an example operation of an example, select group of devices operable to employ techniques described herein.

Referring to FIG. 3, there is shown a timing diagram 300 representing example communications among two sensors, an aggregator, and a tag in accordance with the present invention. The timing diagram 300 provides a first sensor timeline 302, a second sensor timeline 304, an aggregator timeline 306, and a tag timeline 308. The first sensor timeline 302, a second sensor timeline 304, an aggregator timeline 306, and a tag timeline 308 represent, in abstract form, example transmit and receive times by a first sensor 310, a second sensor 312, an aggregator 314, and a tag 316, respectively. It is important to note that the timing diagram 300 represents relative timing for the example communication so the actual time for the communications is not presented. It is also important to note that specific delays, such as dwell times and propagation delays may, may be represented by the timing diagram 300 but are not represented to scale, in order to simplify the general operation of the clock domain translation. described herein.

The first and second sensors 310, 312 provide periodic reports 318-324 to the aggregator 314. In particular, the first sensor 310 may transmits a prior first sensor report 318 to the aggregator 314 at a prior first transmit time 326 and a latter first sensor report 320 at a latter first transmit time 328. Similarly, the second sensor 312 may transmit a prior second sensor report 322 to the aggregator 314 at a prior second transmit time 330 and a latter second sensor report 324 at a latter second transmit time 332. The aggregator 314 may receive the prior first sensor report 318 at a prior first receive time 334 resulting in a prior first propagation delay 336, and the aggregator may receive the latter first sensor report 320 at a latter first receive time 338 resulting in a latter first propagation delay 340. Similarly, the aggregator 314 may receive the prior second sensor report 322 at a prior second receive time 342 resulting in a prior second propagation delay 344, and the aggregator may receive the latter second sensor report 324 at a latter second receive time 346 resulting in a latter second propagation delay 348. Each sensor/aggregator pair may be associated with a particular propagation delay value.

Still referring to FIG. 3, the timing diagram 300 represents an example operation of the system for translating clock domain for non-synchronized sensors. The tag 316 is configured to transmit a beacon 350, 352 to the first sensor 310 and the second sensor 312. In particular, the tag 310 may transmits the beacon 350, 352 to the first and second sensors 310, 312 at a beacon transmit time 354. The first sensor 310 may receive the beacon 350 at a first beacon receive time 356 time in the sensor clock domain resulting in a first beacon propagation delay 358, and the second sensor 312 may receive the beacon 352 (same as the beacon 350) at a second beacon receive time 360 time in the sensor clock domain resulting in a second beacon propagation delay 362. The first and second beacon receive times 356, 360 may be different because the first and second beacons are located at different locations. For some embodiments, the beacon transmitted by the tag may include a tag identification.

The first sensor 310 is further configured to transmit a first current report 364 to the aggregator 314, in which the first current report includes the first beacon receive time, and the second sensor 312 is further configured to transmit a second current report 366 to the aggregator, in which the second current report includes the second beacon receive time. In particular, the first sensor 310 may transmits the first current report 364 to the aggregator 314 at a current first transmit time 368, and the second sensor 312 may transmit the second current report 366 to the aggregator at a current second transmit time 370. The aggregator 314 may receive the first current report 364 at a current first receive time 372 time in the aggregator clock domain resulting in a first report propagation delay 374, and the aggregator may receive the second current report 366 at a current second receive time 376 time in the aggregator clock domain resulting in a second report propagation delay 378.

As described above, various reports may be communicated to the aggregator 314 by the first and second sensors 310, 312, including the prior and latter first sensor reports 318, 320, the prior and latter second sensor reports 322, 324, and the first and second current reports 364, 366. Each report described above may include a tag identification associate with each tag 316 and a report transmit time in the sensor clock domain associated with the report. Examples of the report transmit time include the prior first transmit time 326, the latter first transmit time 328, the prior second transmit time 330, the latter second transmit time 332, the current first transmit time 368, and the current second transmit time 370.

The upstream device, such as the aggregator 314 and other devices 108, 218, 220, shown in FIGS. 1 and 3, may determine a first beacon receive time in the aggregator clock domain based, at least in part, on the first beacon receive time 356 in the sensor clock domain, a first current report transmit time 368 and a first previous report transit time (such as 326) in the sensor clock domain, and a first current report receive time 372 and a first previous report receive time (such as 334) in the aggregator clock domain. Likewise, the upstream device may determine a second beacon receive time in the aggregator clock domain based, at least in part, on the second beacon receive time 360 in the sensor clock domain, a second current report transmit time 370 and a second previous report transit time (such as 330) in the sensor clock domain, and a second current report receive time 376 and a second previous report receive time (such as 342) in the aggregator clock domain.

FIG. 3 also represents a first dwell time 380 at the first sensor 310, a second dwell time 382 at the second sensor 312, and a delta 384 at the aggregator 314. The first dwell time 380 is based on the time, at the first sensor 310, between receiving a beacon and transmitting the measurement data upstream to the collection point, such as the aggregator 314. Similarly, the second dwell time 382 is based on the time, at the second sensor 312, between receiving the beacon and transmitting the measurement data upstream to the collection point. The delta 384 represents the difference between the report receive times in the aggregator clock domain of the first and second sensors 310, 312 based on a given beacon transmitted by the tag 316.

Figure 4:
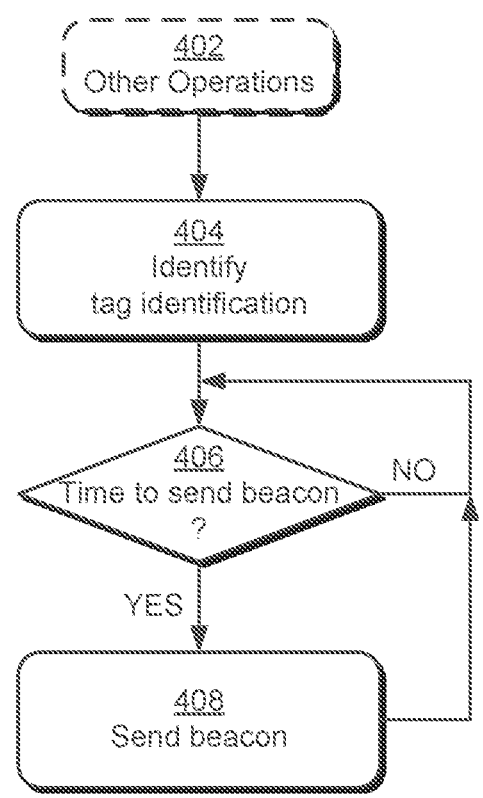
FIG. 4 is a flow diagram of an example operation of the tag of FIGS. 1 through 3.

Referring to FIG. 4, there is shown a flow diagram of an example operation 400 of a tag, such as the tags 106, 204, 316 of FIGS. 1 through 3. The example operation 400 of the tag may include various operations (402) other than operations 404, 406, 408 specific to clock domain translation. For clock domain translation, the tag may identify (404) a tag identification. For example, the tag may store in a memory component an identification number or other representation corresponding to the tag. After the tag identification is established, the tag may determine (406) whether it is an appropriate time to broadcast a beacon. For example, the tag may broadcast the beacon on a particular channel, such as channel A in reference to FIG. 2 above, that is substantially devoted to listening to tags by proximal sensors 206. The tag may broadcast the beacon at periodic intervals. For some embodiments, the broadcast intervals may be modified based on detected conditions such as motion detected by the tag or a signal received by the tag which indicates proximity to a designated area, such as a peripheral area beyond which sensors are less frequent or non-existent. When it is time to transmit a beacon, the tag may broadcast (408) the beacon that includes the tag identification within a proximity of the tag, which may be restricted by broadcasting range and other considerations. The tag may then return to determining (406) whether a beacon should be broadcast.

Figure 5:
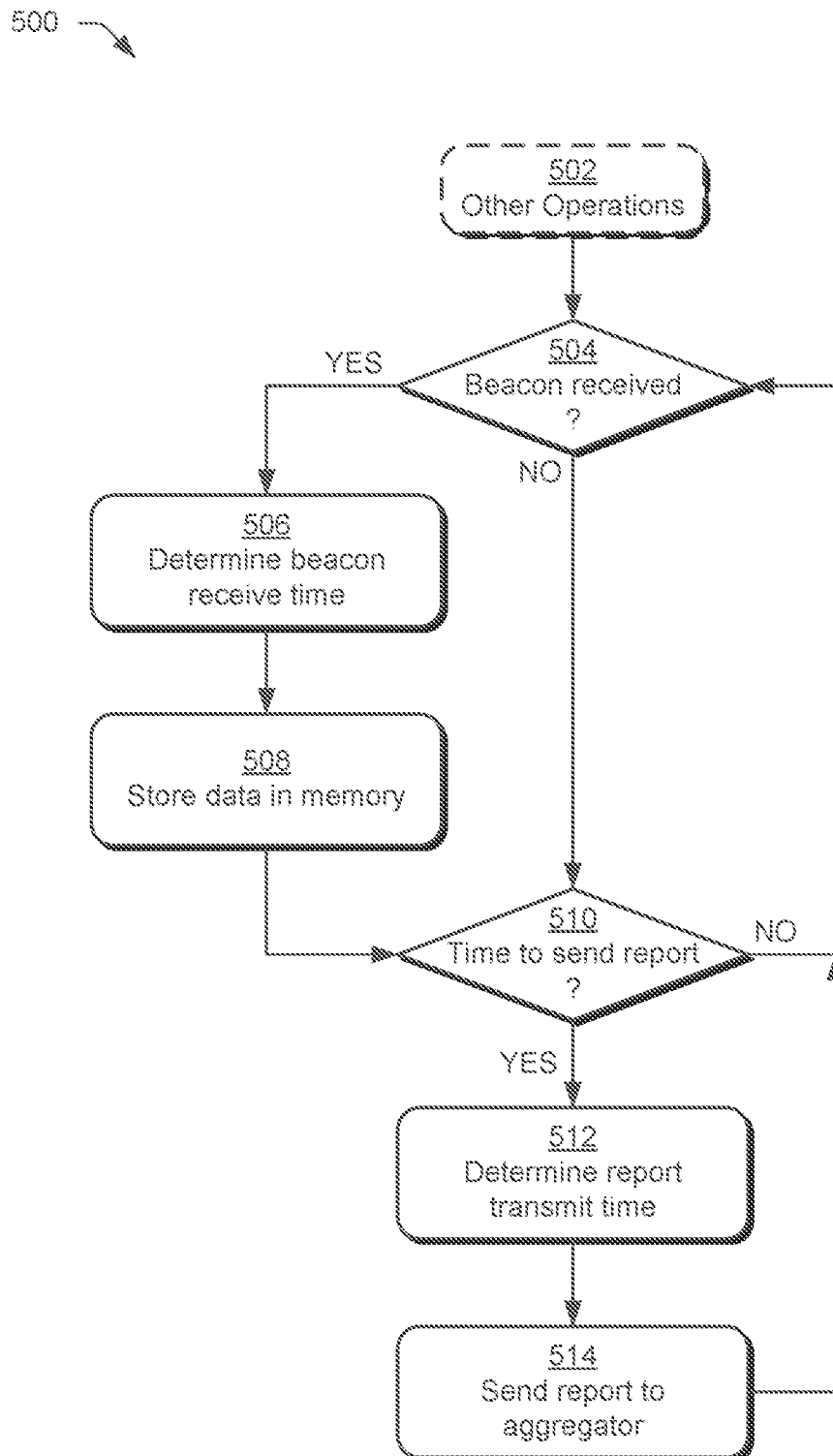
FIG. 5 is a flow diagram of an example operation of one of the sensors of FIGS. 1 through 3.

Referring to FIG. 5, there is shown a flow diagram of an example operation 500 of a sensor, such as the sensors 104, 206, 208, 310, 312 of FIGS. 1 through 3. The example operation 500 of the sensor may include various operations (502) other than operations 504-514 specific to clock domain translation. The sensor may continue these other operations (502) until the sensor receives (504) a beacon from a tag. The sensor may determine (506) a beacon receive time in the sensor clock domain in response to receiving the beacon from the tag, such as identifying a beacon receive time 356, 360 represented by FIG. 3. The sensor may then store (508) the information, such as the tag identification received, via the beacon and the beacon receive time in the sensor clock domain in a memory component of the sensor.

Regardless of whether the sensor receives (504) a beacon, the sensor may determine (510) whether it is an appropriate time to transmit a report to an aggregator. For example, the sensor may broadcast the report on a particular channel, such as channel B in reference to FIG. 2 above, that is substantially devoted to listening to sensors by the aggregators 210. For some embodiments, reports are transmitted at a predetermined interval. For some embodiments, reports are transmitted in response to one or more events, such as receipt and processing of a beacon or group of beacons. For some embodiments, reports are transmitted based on a combination of factors, such as predetermined time intervals and in response to one or more events. If the sensor determines (510) that a report is not to be transmitted, then the sensor may then return to checking (504) whether a beacon has been received from a tag. Otherwise, the sensor determines (512) a report transmit time in the sensor clock domain, such as report transmit times 326, 328, 330, 332, 368, 370 represented by FIG. 3, in response to determining (510) that a report is to be transmitted to an aggregator. When it is time to transmit a report, the sensor may transmit (514) the report that includes information provided by the tag, the determined beacon receive time in the sensor clock domain, and the determined report transmit time in the sensor clock domain. The sensor may then return to checking (504) whether a beacon has been received from a tag.

Figure 6:
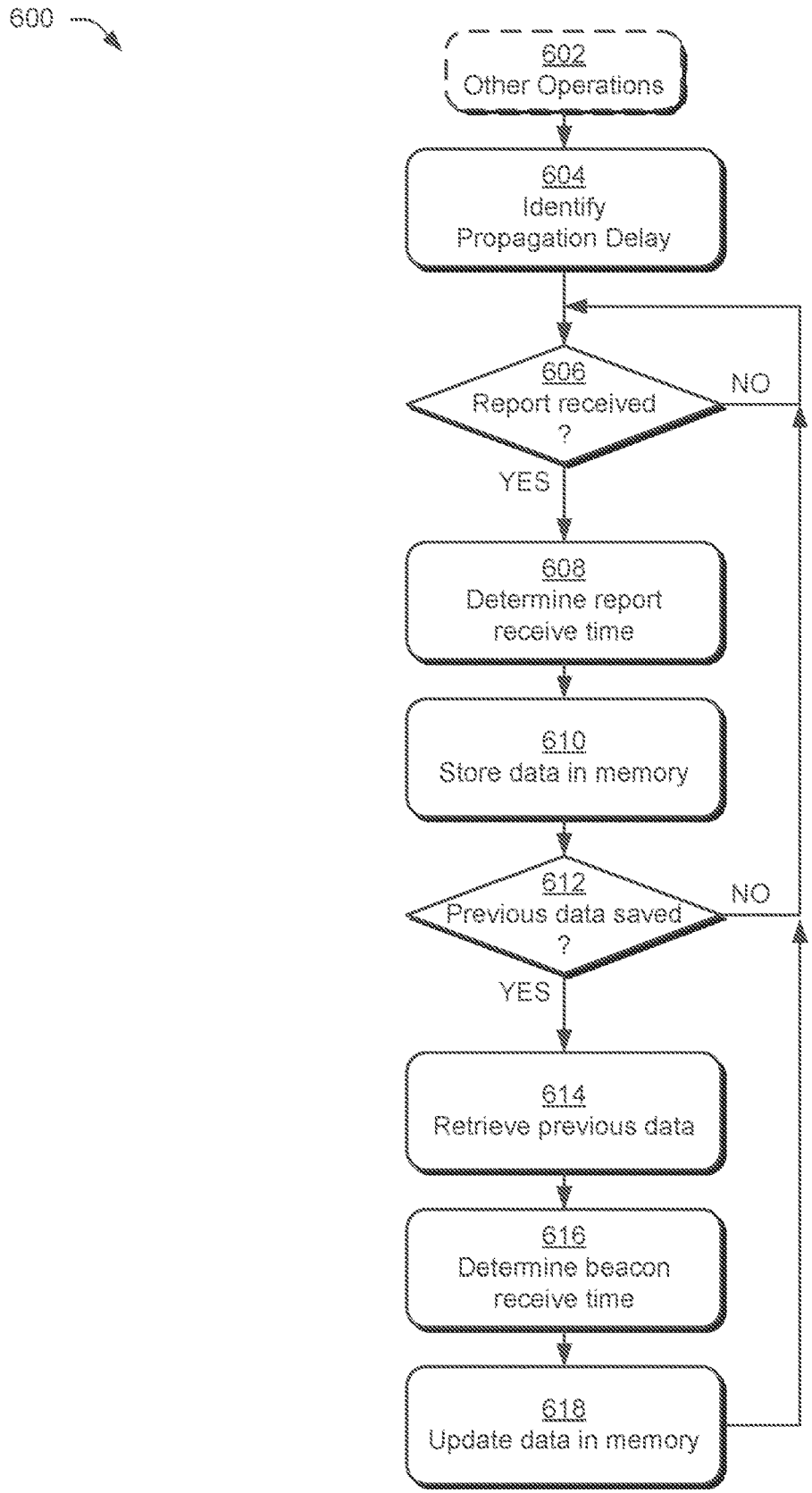
FIG. 6 is a flow diagram of an example operation of the upstream device, or one of the upstream devices, of FIGS. 1 through 3.

Referring to FIG. 6, there is shown a flow diagram of an example operation 600 of an upstream device, such as the aggregators 118, 210, 314 of FIGS. 1 through 3, for translating clock domain for non-synchronized sensors. The example operation 500 of the upstream device may include various operations (602) other than operations 604-618 specific to clock domain translation. Also, the upstream device may perform one or more preliminary operations, such as identifying (604) a propagation delay, before the regular operations 606-618 of the clock domain translation. The upstream device may continue the other operations (602) and/or the preliminary operations (604) until the aggregator receives a report from a sensor. The upstream device detects (606), at a communication component, a report received from a particular sensor of the non-synchronized sensors. The report may include a tag identification corresponding to a source device, such as the tag.

In response to receiving (606) one or more reports from a sensor, the upstream device is configured to determine (608) a report receive time in the aggregator clock domain, such as identifying a report receive time 334, 338, 342, 346, 372, 376 represented by FIG. 3, for each report. In this manner, the upstream device identifies a current report receive time in an aggregator clock domain in response to detecting the report by the communication component. The report includes a beacon receive time in a sensor clock domain and a current report transmit time in the sensor clock domain. The upstream device may then store (610) information received via the beacon, received via the report, and/or determined based on the report in a memory component of the sensor. The information received via the beacon includes the tag information, and the information received via the report includes the beacon receive time in the sensor clock domain and the report transmit time in the sensor clock domain. The information determined based on the report includes the report receive time in the aggregator clock domain.

In response to determining (608) the report receive time and/or storing (610) the information in the memory component, the upstream device may then determine (612) whether information for the same sensor or sensors are available in the memory component of the upstream device, or a device readily accessible by the upstream device. In particular, the upstream device determines (612) whether the previous report transmit time in the sensor clock domain and previous report receive time in the aggregator clock domain corresponding to the same sensor as the recently (i.e., currently) received report transmit time in the sensor clock domain and determined report receive time in the aggregator clock domain are readily available. If the previously stored information is not readily available (such as, the first packet received from the particular sensor), then the upstream device returns to operations awaiting a report to be received (608). If the previously stored information is available, then the upstream device proceeds with retrieving (614) the previous report transmit time in the sensor clock domain and previous report receive time in the aggregator clock domain from the memory component. The previous report receive time is received earlier in time than the current report receive time, and the previous report transmit time is received earlier in time than the current report transmit time. The upstream device may also retrieve (614) the propagation delay, previously determined (604), from the memory component.

The upstream device determines (616) a beacon receive time in the aggregator clock domain in response to retrieving (614) the previously store information. The beacon receive time in the sensor clock domain is associated with a beacon received by the particular sensor from the source device. In particular, the upstream device translates (616), for each beacon of multiple beacons, the beacon receive time from the sensor clock domain to an aggregator clock domain. The beacon receive time in the aggregator clock domain may be determined based, at least in part, on a linear interpolation if the clock rate error is relatively constant. For example, the linear interpolation may use the beacon reception data of first and second sensors, report transmission data of the first and second sensors, and report reception data of the upstream device. Specifically, the upstream device may determine, at a processor, the beacon receive time in the aggregator clock domain based, at least in part, on the beacon receive time in the sensor clock domain, the current report transmit time, the current report receive time, the previous report receive time, the previous report transmit time. The beacon receive time in the aggregator clock domain may be determined based, at least in part, on more sophisticated conversion techniques if there is significant clock rate drift within dwell times.

In determining (616) the beacon receive time in the aggregator clock domain, the upstream device establishes a report ratio of a difference of the current and previous report receive times in the aggregator clock domain to a difference of the current and previous report transmit times in the sensor clock domain. The upstream device applies the report ratio to a difference of the beacon receive time in the sensor clock domain and the previous report transmit time. Linear interpolation of the clock domain translation from the sensor clock domain to the aggregator clock domain may be represented by the following equation:

$$Ba = Rxp + (Bs - Txp)\frac{Rxc - Rxp}{Txc - Txp} - PD. \quad (1)$$

For the above example, Txc represents the current report transmit time (sensor clock domain), Rxc represents current report receive time (aggregator clock domain), Txp represents previous report transmit time (sensor clock domain), Rxp represents previous report receive time (aggregator clock domain), Bs represents beacon receive time (sensor clock domain), Ba represents beacon receive time (aggregator clock domain), and PD represents propagation delay (aggregator clock domain).

After determining (616) the beacon receive time in the aggregator clock domain, the upstream device updates (618) the information in the memory component and/or performs (618) one or more building automation functions using the beacon receive time. For example, the upstream device may determine a location of the tag based on a delta of the first and second beacon receive times in the aggregator clock domain. As another example, the upstream device may update the previous report receive time in the aggregator domain clock with the current report receive time in the aggregator domain clock and update the previous report transmit time in the sensor domain clock with the current report transmit time in the sensor domain clock.

As stated above, the upstream device may identify (604) a propagation delay (PD) associated with each device communicating with the upstream device. In determining (616) the beacon receive time in the aggregator clock domain, the upstream device may determine the beacon receive time based, at least in part, on the propagation delay. The propagation delay may be entered manually or calculated automatically on-the-fly since the sensor locations are generally fixed and known. The propagation delay calculation may take advantage of clock domain translation. For example, the sensor report and aggregator acknowledgment report may apply a Single-Sided Two-Way Ranging exchange. The sensor may store its report transmit time or send/receive the report transmit time via an upstream device. The upstream device may add its own turn-around time to the acknowledgment report or store it locally. Upon receiving the acknowledgment report, the sensor may subtract the transmit time from the receive time, resulting in a round trip time in sensor clock domain. The resulting information may be sent back to upstream device immediately or stored for inclusion in a future report. When the upstream device receives this information, the upstream device converts the round-trip time to the aggregator clock domain, then subtracts its own turn-around time (which is already in aggregator clock domain) and divides by two. This propagation delay, which includes antenna delay and any other delays inherent in sending and receiving a report, may be utilized for correcting the beacon receive times.

Figure 7:
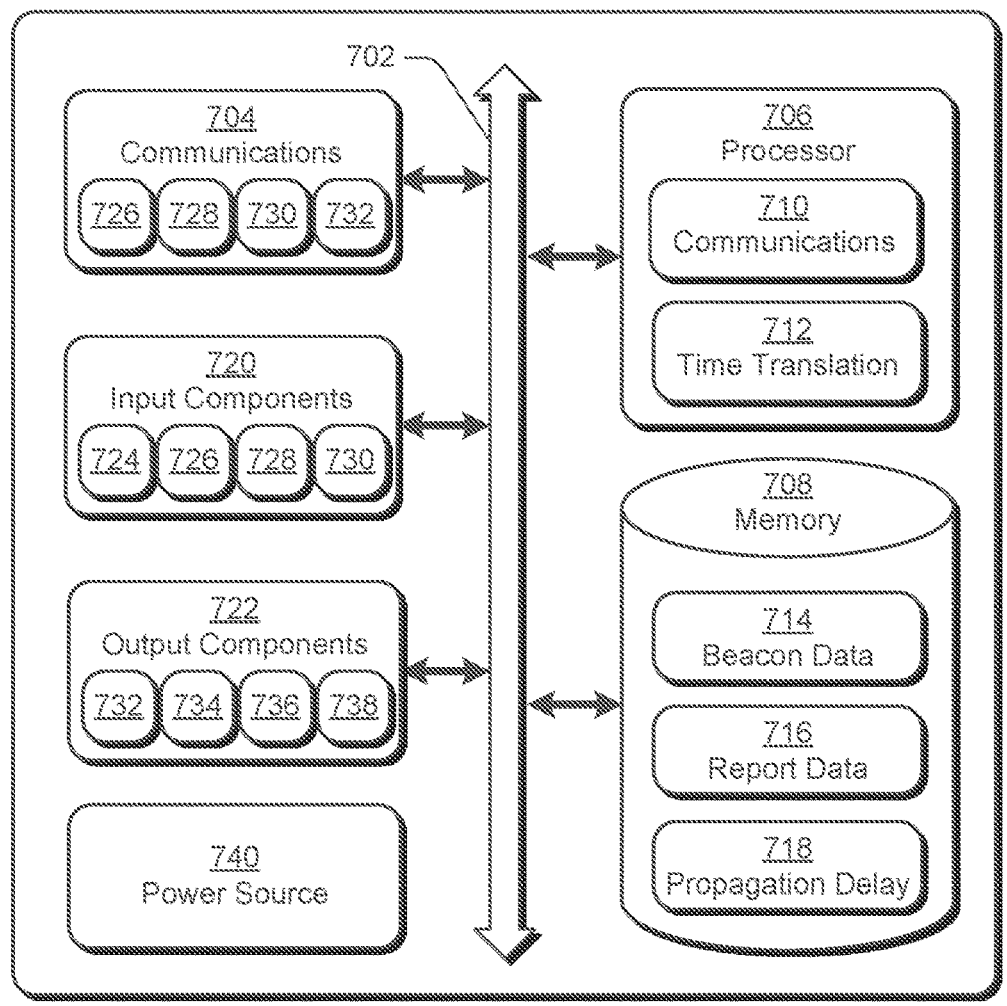
FIG. 7 is a block diagram of example components of a sensor or an aggregator of FIGS. 1 through 3.

FIG. 7 represents example device components 700 of the sensors and/or upstream devices 104, 108, 202, 218, 220 in accordance with the approach for translating clock domain for non-synchronized sensors. The device components 700 comprise a communication bus 702 for interconnecting the other device components directly or indirectly, one or more communication components 704 communicating other entities via a wired or wireless network, one or more processors 706, and one or more memory components 708. The communication component 704 is configured to detect a report received from a particular sensor of the non-synchronized sensors, in which the report includes a beacon receive time in a sensor clock domain and a current report transmit time in the sensor clock domain. The communication component 704 may utilize wireless technology for communication, such as, but are not limited to, Ultrawide Band, Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology.

The one or more processors 706 may execute code and process data received at other components of the device components 700, such as information received at the communication component 704 or stored at the memory component 708. The code associated with the building automation system and stored by the memory component 708 may include, but is not limited to, operating systems, applications, modules, drivers, and the like. An operating system includes executable code that controls basic functions of the sensors or the upstream devices 104, 108, 202, 218, 220, such as interactions among the various components of the device components 700, communication with external devices via the communication component 504, and storage and retrieval of code and data to and from the memory component 508.

The processor 706 is configured to perform multiple functions. For some embodiments, the processor 706 may identify a current report receive time in an aggregator clock domain based on the report detected at the communication component. For one embodiment, the processor 706 determines a beacon receive time in the aggregator clock domain based, at least in part, on the beacon receive time in the sensor clock domain, the current report transmit time, the current report receive time, the previous report receive time, the previous report transmit time. For another embodiment, the processor 706 determines the beacon receive time in the aggregator clock domain based, at least in part, on a report ratio of a difference of the current and previous report receive times in the aggregator clock domain to a difference of the current and previous report transmit times in the sensor clock domain. For yet another embodiment, the processor 706 determines the beacon receive time in the aggregator clock domain based, at least in part, an application of the report ratio to a difference of the beacon receive time in the sensor clock domain and the previous report transmit time. For one or more of these embodiments, the processor 706 may, in the memory component, update the previous report receive time in the aggregator domain clock with the current report receive time in the aggregator domain clock and update the previous report transmit time in the sensor domain clock with the current report transmit time in the sensor domain clock.

Each application includes executable code to provide specific functionality for the processor 706 and/or remaining components of the sensors or the upstream devices 104, 108, 202, 218, 220. An example of an application executable by the processor 706 includes, but is not limited to, a communications module 710 to manage receipt of beacons, transmission of reports, receipt of reports, and identification/recording of transmit or receive times for each communication. Another example of an application executable by the processor 706 includes, but is not limited to, a time clock translation module 712 to determines a beacon receive time in the aggregator clock domain, as described above. For some embodiments, the time clock translation module 712 also determines a location of the tag based on a delta of beacon receive times in the aggregator clock domain.

The memory component 708 is configured to store and provide a previous report receive time in the aggregator clock domain and a previous report transmit time in the sensor clock domain. Data, stored by the memory component 708, is information that may be referenced and/or manipulated by an operating system or application for performing functions of the sensors or the upstream devices 104, 108, 202, 218, 220. Examples of data stored by the memory component 708 may include, but are not limited to, beacon data 714, report data 716, and propagation delay data 718. The beacon data 714 includes a tag identification corresponding to a source device. The report data 716 includes the beacon receive time in a sensor clock domain is associated with a beacon received by the particular sensor from the source device. The report data 716 may also include the previous report receive time which has an earlier time stamp than the current report receive time and, similarly, the previous report transmit time which has an earlier time stamp than the current report transmit time. The propagation delay data of the memory component includes a propagation delay so that the processor 706 may determines the beacon receive time in the aggregator clock domain based, at least in part, on the propagation delay.

The device components 700 of each sensor or the upstream device 104, 108, 202, 218, 220 may further comprise one or more input components 720 and/or one or more output components 722. The input components 720 and the output components 722 of the device components 700 may include one or more visual, audio, mechanical, and/or other components. Examples of the input components 720 may include, but is not limited to, an infrared sensor 724 (such as a passive infrared sensor), ultrasonic sensor 726, microwave sensor 728, tomographic sensor 730, and a combination of sensing technologies. Examples of the output components 722 may include, but is not limited to, displays 732, visual indicators 734, audio speakers 736, mechanical actuators 738, and a combination of output technologies.

The device components 700 may further comprise a power source 740, such as a power supply or a portable battery, for providing power to the other device components 700 of the sensor or upstream device 104, 108, 202, 218, 220.

It is to be understood that FIG. 7 is provided for illustrative purposes only to represent examples of the device components 700 of the sensors or the upstream devices 104, 108, 202, 218, 220 and is not intended to be a complete diagram of the various components that may be utilized by each device. Device components 700 incorporated into devices, such as a sensor 104 vs. a sensor hub 108, may differ and depend upon the needs and capabilities of each device. Therefore, each sensor or upstream device 104, 108, 202, 218, 220 may include various other components not shown in FIG. 7, may include a combination of two or more components, or a division of a particular component into two or more separate components, and still be within the scope of the present invention.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. An upstream device for translating clock domain for non-synchronized sensors comprising:
    a communication component configured to detect a report received from a particular sensor of the non-synchronized sensors, the report including a beacon receive time in a sensor clock domain and a current report transmit time in the sensor clock domain;
    a memory component configured to provide a previous report receive time in an aggregator clock domain and a previous report transmit time in the sensor clock domain; and
    a processor configured to identify a current report receive time in the aggregator clock domain based on the report detected at the communication component and determine a beacon receive time in the aggregator clock domain based, at least in part, on the beacon receive time in the sensor clock domain, the current report transmit time, the current report receive time, the previous report receive time, the previous report transmit time,
    wherein the processor determines the beacon receive time in the aggregator clock domain based, at least in part, on a report ratio of a difference of the current and previous report receive times in the aggregator clock domain to a difference of the current and previous report transmit times in the sensor clock domain.

2. The upstream device as described in claim 1, wherein:
    the previous report receive time of the memory component has an earlier time stamp than the current report receive time; and
    the previous report transmit time of the memory component has an earlier time stamp than the current report transmit time.

3. The upstream device as described in claim 1, wherein the beacon receive time in the sensor clock domain is associated with a beacon received by the particular sensor from a source device.

4. The upstream device as described in claim 1, wherein the processor determines the beacon receive time in the aggregator clock domain based, at least in part, an application of the report ratio to a difference of the beacon receive time in the sensor clock domain and the previous report transmit time.

5. The upstream device as described in claim 1, wherein:
    the memory component includes a propagation delay; and
    the processor determines the beacon receive time in the aggregator clock domain based, at least in part, on the propagation delay.

6. The upstream device as described in claim 1, wherein:
    the previous report receive time in the aggregator domain clock is updated in the memory component with the current report receive time in the aggregator domain clock; and
    the previous report transmit time in the sensor domain clock is updated with the current report transmit time in the sensor domain clock.

7. The upstream device as described in claim 1, wherein the communication component detects the report via ultrawide band wireless communications.

8. A method for translating clock domain for non-synchronized sensors comprising:
    detecting, at a communication component, a report received from a particular sensor of the non-synchronized sensors, the report including a beacon receive time in a sensor clock domain and a current report transmit time in the sensor clock domain;
    identifying a current report receive time in an aggregator clock domain in response to detecting the report by the communication component;
    retrieving, from the memory component, a previous report receive time in the aggregator clock domain and a previous report transmit time in the sensor clock domain;
    determining, at a processor, a beacon receive time in the aggregator clock domain based, at least in part, on the beacon receive time in the sensor clock domain, the current report transmit time, the current report receive time, the previous report receive time, the previous report transmit time,
    wherein determining the beacon receive time in the aggregator clock domain includes establishing a report ratio of a difference of the current and previous report receive times in the aggregator clock domain to a difference of the current and previous report transmit times in the sensor clock domain.

9. The method as described in claim 8, wherein:
    the previous report receive time is received earlier in time than the current report receive time; and
    the previous report transmit time is received earlier in time than the current report transmit time.

10. The method as described in claim 8, wherein the beacon receive time in the sensor clock domain is associated with a beacon received by the particular sensor from a source device.

11. The method as described in claim 8, wherein determining the beacon receive time in the aggregator clock domain includes applying the report ratio to a difference of the beacon receive time in the sensor clock domain and the previous report transmit time.

12. The method as described in claim 8, further comprising retrieving, from the memory component, a propagation delay, wherein:
    determining the beacon receive time in the aggregator clock domain includes determining the beacon receive time based, at least in part, on the propagation delay.

13. The method as described in claim 8, further comprising:
    updating the previous report receive time in the aggregator domain clock with the current report receive time in the aggregator domain clock; and
    updating the previous report transmit time in the sensor domain clock with the current report transmit time in the sensor domain clock.

14. The method as described in claim 8, wherein detecting the report received from the particular sensor includes detecting the report via ultrawide band wireless communications.

* * * * *